(12) United States Patent
Saito et al.

(10) Patent No.: US 9,255,205 B2
(45) Date of Patent: Feb. 9, 2016

(54) SILVER PARTICLE-CONTAINING COMPOSITION, DISPERSION SOLUTION, AND PASTE AND METHOD FOR MANUFACTURING THE SAME

(75) Inventors: Yu Saito, Honjo (JP); Shinya Sasaki, Okayama (JP)

(73) Assignee: DOWA ELECTRONICS MATERIALS CO., LTD., Tokyo (JP)

(*) Notice: Subject to any disclaimer, the term of this patent is extended or adjusted under 35 U.S.C. 154(b) by 0 days.

(21) Appl. No.: 13/884,024

(22) PCT Filed: Oct. 28, 2011

(86) PCT No.: PCT/JP2011/074963
§ 371 (c)(1),
(2), (4) Date: May 8, 2013

(87) PCT Pub. No.: WO2012/063659
PCT Pub. Date: May 18, 2012

(65) Prior Publication Data
US 2013/0234078 A1    Sep. 12, 2013

(30) Foreign Application Priority Data

Nov. 10, 2010    (JP) .................. 2010-252252

(51) Int. Cl.
C09D 5/24       (2006.01)
H01B 1/22       (2006.01)
B22F 1/00       (2006.01)

(52) U.S. Cl.
CPC ................ C09D 5/24 (2013.01); B22F 1/0062 (2013.01); H01B 1/22 (2013.01); *B22F 2999/00* (2013.01)

(58) Field of Classification Search
CPC ............... B22F 1/02; B22F 1/00; H01B 1/22; H01B 13/00
USPC ....................... 252/500, 514; 427/58
See application file for complete search history.

(56) References Cited

U.S. PATENT DOCUMENTS

| | | | |
|---|---|---|---|
| 5,227,093 A * | 7/1993 | Cole et al. ...................... 252/512 |
| 7,559,970 B2 * | 7/2009 | Kim et al. ........................ 75/711 |
| 2005/0074394 A1 * | 4/2005 | Berube et al. ................. 423/604 |
| 2005/0173680 A1 * | 8/2005 | Yang .............................. 252/500 |
| 2008/0085594 A1 * | 4/2008 | Li et al. ......................... 438/597 |
| 2009/0188701 A1 * | 7/2009 | Tsuzuki et al. ............... 174/252 |

FOREIGN PATENT DOCUMENTS

| | | |
|---|---|---|
| EP | 1 339 073 | 8/2003 |
| JP | 2008-095194 | 4/2008 |
| JP | 2008-150701 | 7/2008 |

(Continued)

*Primary Examiner* — Mark Kopec
*Assistant Examiner* — Danny N Kang
(74) *Attorney, Agent, or Firm* — Clark & Brody

(57) ABSTRACT

The method for manufacturing a silver particle-containing composition according to the invention is directed to a method for manufacturing a silver particle-containing composition coated with a fatty acid and includes a step (A) of preparing silver particles coated with a first fatty acid (a) with 3 to 7 carbon atoms, a second fatty acid (b) with 2 to 20 carbon atoms, and a solvent in which the first and second fatty acids can disperse, respectively, a step (B) of adding the silver particles coated with the first fatty acid (a) and the second fatty acid (b) into the solvent, and a step (C) of substituting the second fatty acid (b) for the first fatty acid (a) coating the silver particles after the addition step.

4 Claims, 10 Drawing Sheets

(56) References Cited

FOREIGN PATENT DOCUMENTS

| JP | 2009-120949 | 6/2009 |
| JP | 2009-235544 | 10/2009 |
| JP | 2009-289745 | 12/2009 |
| WO | 2009/014201 | 1/2009 |

* cited by examiner measurement time (min.)

SILVER PARTICLE-CONTAINING COMPOSITION, DISPERSION SOLUTION, AND PASTE AND METHOD FOR MANUFACTURING THE SAME

TECHNICAL FIELD

This invention relates to a silver particle-containing composition, a dispersion solution and a paste and methods for manufacturing them.

BACKGROUND ART

Recently, metal microparticles with a diameter on the order of micrometers and metal nanoparticles with a diameter on the order of nanometers are occasionally used to form fine traces on printed circuit boards. The fine metal particles, such as copper particles and silver particles, used in this application are generally coated with an organic compound to prevent agglomeration of the particles and to increase the handleability and for some other reasons. The coated silver particles are mixed with a solvent, in combination with resin in some cases, to form into a paste that is then used to form traces by printing methods or other methods.

In this regard, Japanese Unexamined Patent Application Publication No. 2009-289745 (PTL 1) discloses a technology concerning a conductive paste made by dispersing silver powder in a thermosetting resin composition.

CITATION LIST

Patent Literature

[PTL 1] Japanese Unexamined Patent Application Publication No. 2009-289745

SUMMARY OF INVENTION

Technical Problem

According to PTL 1, silver particles are coated with a higher fatty acid or a derivative of a higher fatty acid, and the higher fatty acid or the higher fatty acid derivative is substituted with a fatty acid at a lower level than the higher fatty acid, i.e., a higher/medium-chain fatty acid or a derivative thereof. More specifically, a higher/medium-chain fatty acid with 8 to 16 carbon atoms substitutes for a higher fatty acid with 17 to 24 carbon atoms coating the silver particles. This substitution is intended to improve the sintering property at low temperatures.

However, the number of carbon atoms (hereinafter, sometimes simply referred to as "carbon number") of the fatty acid that coats the silver particles of the technology disclosed in PTL 1 is relatively high before and after the substitution. The silver particles coated with such a fatty acid may not be dispersed in a solvent used for substitution, or, even if dispersed, may not be dispersed homogeneously, possibly hindering proper substitution of a lower-level fatty acid. In addition, some applications require adjustment of hydrophobicity or an increase in carbon number of the fatty acid after substitution with respect to the carbon number of the fatty acid before the substitution for the purpose of imparting other properties; however, the technology disclosed in PTL 1 cannot deal with these problems and requirements.

An object of the present invention is to provide a manufacturing method that can readily obtain a silver particle-containing composition adaptable to needs, and to provide a silver particle-containing composition obtained by the method.

Solution to Problem

The method for manufacturing a silver particle-containing composition according to the present invention is a method for manufacturing a silver particle-containing composition coated with a fatty acid and includes the steps of preparing silver particles coated with a first fatty acid (a) with 3 to 7 carbon atoms, a second fatty acid (b) with 2 to 20 carbon atoms, and a solvent in which the first and second fatty acids can disperse, respectively, adding the silver particles coated with the first fatty acid (a) and the second fatty acid (b) into the solvent (addition step), and substituting the second fatty acid (b) for the first fatty acid (a) coating the silver particles (substitution step) after the addition step.

In the substitution step, the first fatty acid (a) coating the silver particles may not be entirely substituted with the second fatty acid (b), and can be partially substituted. The ratio of substitution can be adjusted by changing the amount of the second fatty acid to be added, the ratio of the second fatty acid to be added with respect to the first fatty acid, and so on to provide required properties.

The carbon number described herein denotes the number of carbon atoms included in a straight chain of fatty acid, but not included in a side chain thereof.

Furthermore, the silver particle-containing composition according to the present invention is a silver particle-containing composition coated with a fatty acid and is manufactured by preparing silver particles coated with a first fatty acid (a) with 3 to 7 carbon atoms, a second fatty acid (b) with 2 to 20 carbon atoms and a solvent in which the first and second fatty acid can disperse, respectively, adding silver particles coated with the first fatty acid (a) and the second fatty acid (b) into the solvent, and substituting the second fatty acid (b) for the first fatty acid (a) coating the silver particles after the addition step.

Advantageous Effects of Invention

According to the method for manufacturing the silver particle-containing composition of the present invention, the carbon number of the fatty acid that coats the silver particles before and after substitution can be changed to any numbers in a relatively small carbon number range. Resultantly, silver particle-containing compositions adaptable to the needs can be readily achieved.

In addition, according to the silver particle-containing composition of the present invention, the carbon number of the fatty acid that coats the silver particles can be changed to any numbers in a relatively small carbon number range to adapt the needs.

DESCRIPTION OF EMBODIMENTS

Figure 1:
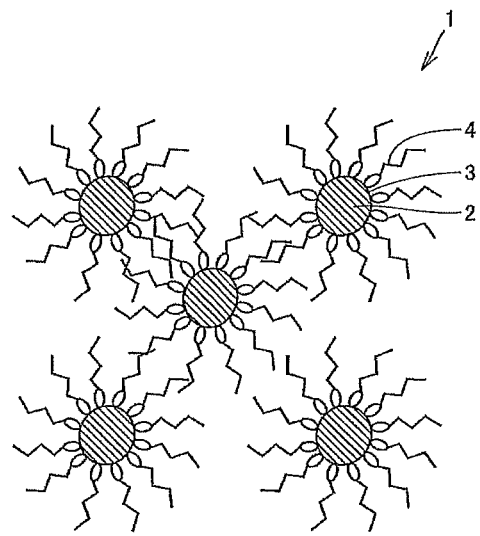
FIG. 1 schematically depicts the appearance of a silver particle-containing composition manufactured by a method according to an embodiment of the present invention.

An embodiment of the present invention will be described below with reference to the drawings. FIG. 1 schematically depicts the appearance of a silver particle-containing composition manufactured by a method according to the embodiment of the present invention. First, the constituent components of the silver particle-containing composition manufactured by the manufacturing method according to the embodiment of the invention will be described.

The silver particle-containing composition 1 manufactured by the method for manufacturing the silver particle-containing composition according to the embodiment of the invention is composed of silver particles, more specifically, is composed of silver particles 2, in the form of primary particulates, with a large number of fatty acid particles 4 binding to the surfaces 3 of the silver particles 2 so that the large number of fatty acid particles 4 coat the surfaces 3 of the silver particles 2. Regarding the coating, the surfaces 3 of the silver particles 2 may be partially exposed, or the fatty acid particles 4 may form a plurality of layers to coat the silver particles. In this invention, the large number of fatty acid particles 4, which coat the surfaces 3 of the silver particles 2, are substituted with other types of fatty acid particles to coat the surfaces 3 of the silver particles 2 with the other types of fatty acid particles.

The silver particles 2, which play the role of the core of the silver particle-containing composition 1, are approximately spherical in shape. The silver particles 2 are microscopic, and the preferable size of the silver particles 2 is, for example, on the order of micrometers or below, and a more preferable size is on the order of nanometers. Specifically, preferable silver particles 2 have a diameter ranging approximately from 1 to 100 nm. To measure the diameter of the silver particles 2 in micrometers, a Microtrac particle size distribution analyzer (9320 HRA-X100 (manufactured by Haneywell—NIKKISO CO., LTD.)) was used, while the silver particles 2 in several hundred nanometers were measured by analyzing the appearance thereof in SEM images, and the silver particles 2 in several nanometers were measured by analyzing the appearance thereof in TEM images.

To make the silver particles 2 suitable for the substitution step, which will be described later, according to the invention, the specific surface area of the silver particles 2 determined by a BET method should be in a range from 0.1 to 40 $m^2/g$, preferably in a range from 0.5 to 40 $m^2/g$, and more preferably in a range from 1.0 to 35 $m^2/g$. The silver particles 2 in these ranges have an affinity for solvents and therefore are suitable to make an efficient substitution of fatty acid in the substitution step.

The fatty acid used before substitution, in other words, the first fatty acid (a) initially coating the silver particles has 3 to 7 carbon atoms. The fatty acid having such carbon numbers often has good dispersibility in solvents, especially in polar solvents, such as alcohols and acetates. Concrete examples of the first fatty acid are: propionic acid, malonic acid and lactic acid each having 3 carbon atoms; butanoic acid and malic acid each having 4 carbon atoms; and sorbic acid and hexanoic acid each having 6 carbon atoms.

A method for manufacturing the silver particles coated with the first fatty acid (a) will be briefly described. First, a predetermined amount of ammonia water in a container is prepared. Second, a predetermined amount of the first fatty acid, for example, sorbic acid is added and dissolved into the ammonia water through 10-minute agitation. Then, a reducing agent, for example, a predetermined amount of hydrazine hydrate is added. Subsequently, silver nitrate dissolved in water is added to accelerate the reductive reaction. In this manner, a yet-to-be-substituted silver particle-containing composition, more specifically, silver particles having the surfaces coated with sorbic acid are manufactured.

For the fatty acid after substitution, or a second fatty acid (b) that coats the silver particles in the end, a fatty acid with 2 to 20 carbon atoms is used. The second fatty acid is selected from various kinds of fatty acids according to the first fatty acid initially used and the usage needs. If a silver particle-containing composition that will be made into a paste later is required to improve the sintering property at low temperatures, for example, a fatty acid with fewer carbon atoms than those of the first fatty acid will be selected as the second fatty acid. If a silver particle-containing composition is required to improve the hydrophobicity, for example, a fatty acid with more carbon atoms than those of the first fatty acid will be selected as the second fatty acid. Concrete examples of the second fatty acid to be selected as described above are: acetic acid having 2 carbon atoms; propionic acid, malonic acid, and lactic acid each having 3 carbon atoms; butanoic acid and malic acid each having 4 carbon atoms; sorbic acid and hexanoic acid each having 6 carbon atoms; octanoic acid having 8 carbon atoms; acetylsalicylic acid having 9 carbon atoms; decanoic acid having 10 carbon atoms; and oleic acid having 18 carbon atoms.

In this invention, the solvent used in the substitution step can be anything as long as the silver particles coated with the first and second fatty acids can disperse in it. In this regard, it is preferable to select a solvent having good dispersibility for the fatty acids before and after the substitution.

Concrete examples of the solvent are: water; diols including octanediol; alcohol; polyol; glycol ether; 1-methylpyrrolidine; pyridine; terpineol; butyl carbitol; butyl carbitol acetate; texanol; phenoxypropanol; diethylene glycol monobutyl ether; diethylene glycol monobutyl ether acetate; γ-butyrolactone; ethylene glycol monomethylether acetate; ethylene glycol monoethylether acetate; methoxy butyl acetate; methoxypropyl acetate; diethyleneglycol monoetyl ether acetate; ethyl lactate; 1-ocatanol; and combined solvents thereof.

Figure 2:
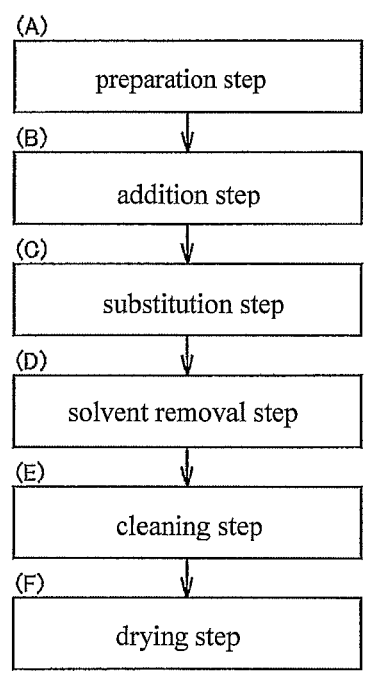
FIG. 2 is a flow chart showing representative steps of the method for manufacturing the silver particle-containing composition according to the embodiment of the invention.

Description will be now made about the method for manufacturing the silver particle-containing composition according to the embodiment of the present invention. FIG. 2 is a flow chart showing representative steps of the method for manufacturing the silver particle-containing composition according to the embodiment of the invention.

First, silver particles coated with a first fatty acid (a) with 3 to 7 carbon atoms, in other words, a silver particle-containing composition before substitution, a second fatty acid (b) with 2 to 20 carbon atoms, and a solvent in which the first and second fatty acids can disperse, respectively are prepared (FIG. 2 (A)) (preparation step).

Then, the silver particles coated with the first fatty acid (a) and the second fatty acid are respectively added in the solvent (FIG. 2 (B)) (addition step). For example, subsequent to addition of the silver particles coated with the first fatty acid (a), the second fatty acid (b) is added. The order of adding the materials and adding techniques in the addition step are not specifically limited. The second fatty acid (b) can be of course added first, and subsequently the silver particles coated with the first fatty acid (a) can be added, or alternatively, the silver particles coated with the first fatty acid (a) and the second fatty acid (b) can be added together at the same time. In the case of using a solid second fatty acid (b), the second fatty acid (b) that has been dissolved in the solvent in advance can be added.

Then, the first fatty acid (a) that coats the silver particles is substituted with the second fatty acid (b) (FIG. 2 (C)) (substitution step). Specific substitution may be done, for example, by agitating the silver particles coated with the first fatty acid (a) and the second fatty acid added in the solvent and subjecting the solvent to an ultrasonic vibration process with ultrasound.

Then, the solvent is removed, or, in other words, the silver particles and the solvent are separated from each other (FIG. 2 (D)) (solvent removal step). The separation between the solvent and the silver particles to be obtained can be achieved by a well-known filtration method. In this case, the filtration can be performed after removal of the supernatant by decantation.

Next, the removal of the solvent is followed by cleaning of the silver particle-containing composition (FIG. 2 (E)) (cleaning step). In the cleaning step, for example, a solvent of the same kind as the solvent used for substitution is preferable to use as a cleaning liquid because such a cleaning liquid, which is poured onto the silver particle-containing composition to rinse it, is free from impurities.

Then, the cleaned silver particle-containing composition is dried (FIG. 2 (F)) (drying step). There are not specific restrictions to dry the composition; however, the drying step needs to be performed at temperatures lower than a temperature that could induce desorption and decomposition of the organic compound coating the silver particles. In this case, the drying step can be performed under reduced pressure conditions.

In this manner, the method for manufacturing the silver particle-containing composition according to the embodiment of the invention provides the silver particle-containing composition. According to the method for manufacturing the silver particle-containing composition, silver particle-containing compositions that meet the needs can be readily achieved. Specifically, a silver particle-containing composition with about 3 carbon atoms can be readily obtained from the silver particle-containing composition with about 6 carbon atoms. The silver particle-containing composition with about a relatively small number of carbon atoms, or 3, has excellent sintering property at low temperatures, and therefore is useful for trace formation on printed circuit boards as described above and such a silver particle-containing composition can be readily achieved. In addition, a silver particle-containing composition with about 8 carbon atoms can be readily obtained from the silver particle-containing composition with about 6 carbon atoms. Regarding the silver particle-containing composition having about 8 carbon atoms, a part of functional group of the long chain fatty acid can be substituted with a required functional group, thereby readily obtaining the silver particle-containing composition adaptable to the needs.

This manufacturing method can prevent agglomeration of the particles during substitution and therefore can more effectively provide a silver particle-containing composition adaptable to the needs. This method can also accelerate the substitution reaction at relatively low temperatures, thereby significantly reducing the possibility for the silver particles sintering during the substitution reaction, especially, to obtain silver particles coated with fatty acid with a very few carbon atoms, like 3 or 4 carbon atoms.

The silver particle-containing composition according to the invention is a silver particle-containing composition coated with a fatty acid and is manufactured by preparing silver particles coated with a first fatty acid (a) with 3 to 7 carbon atoms, a second fatty acid (b) with 2 to 20 carbon atoms, and a solvent in which the first and second fatty acids can disperse, respectively, adding the silver particles coated with the first fatty acid (a) and the second fatty acid (b) into the solvent, and substituting the second fatty acid (b) for the first fatty acid (a) coating the silver particles.

Figure 3:
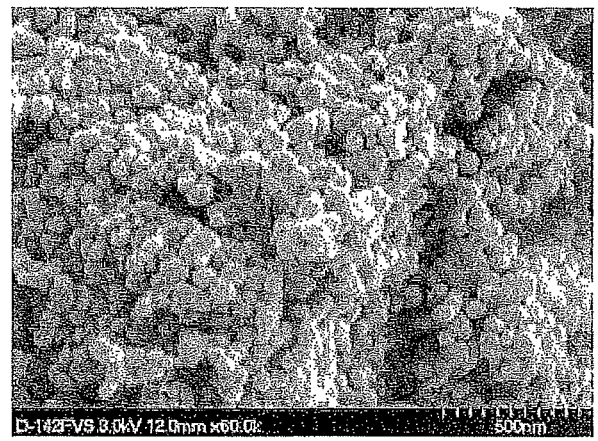
FIG. 3 is an SEM image of an enlarged part of the silver particle-containing composition coated with sorbic acid before substitution.
Figure 4:
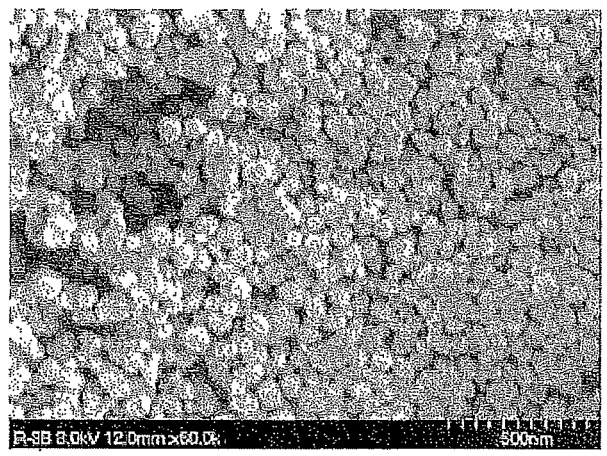
FIG. 4 is an SEM image of an enlarged part of the silver particle-containing composition coated with butanoic acid after substitution.

FIG. 3 is an SEM (Scanning Electron Microscope) image of an enlarged part of the silver particle-containing composition coated with sorbic acid before substitution. FIG. 4 is an SEM image of an enlarged part of the silver particle-containing composition coated with butanoic acid after substitution. The images in FIGS. 3 and 4 are enlarged by 30,000 times.

As can be appreciated from these images, noticeable changes in the appearance features are not observed before and after the substitution of the fatty acids. This means that the substitution operation of the organic acid coating the surfaces does not cause sintering of the particles, which induces extreme increase in diameter of the particles.

Figure 5:
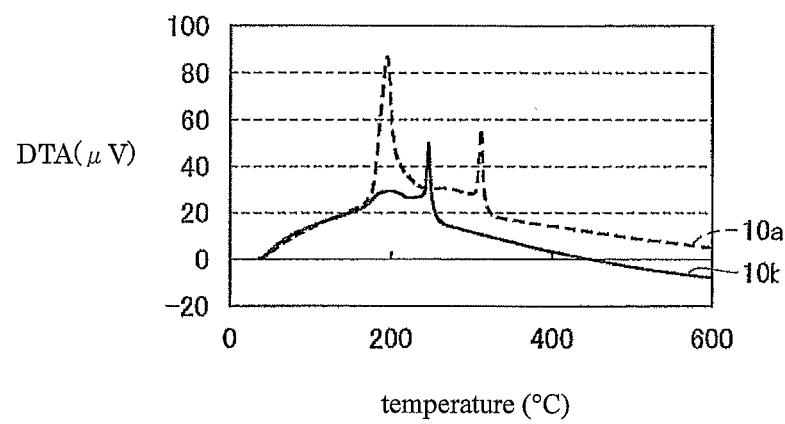
FIG. 5 is a graph showing DTA results of the silver particle-containing composition before and after substitution.
Figure 6:
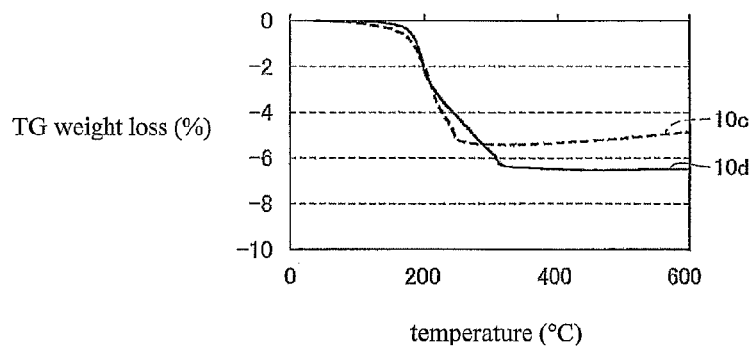
FIG. 6 is a graph showing TG results of the silver particle-containing composition before and after substitution.

Next, the study of TG-DTA before and after substitution will be described below. FIG. 5 is a graph showing DTA results of the silver particle-containing composition before and after substitution. FIG. 6 is a graph showing TG results of the silver particle-containing composition before and after substitution. In FIG. 5, the vertical axis indicates DTA (μV), while the horizontal axis indicates temperature (° C.). In FIG. 6, the vertical axis indicates TG loss rate (%), while the horizontal axis indicates temperature (° C.). In the graph of FIG. 5, the silver particle-containing composition before substitution, specifically, the silver particle-containing composition coated with sorbic acid, is represented by a dotted line 10a, while the silver particle-containing composition after the substitution, specifically, the silver particle-containing composition coated with butanoic acid, is represented by a solid line 10b. In the graph of FIG. 6, the silver particle-containing composition before substitution, specifically, the silver particle-containing composition coated with sorbic acid, is represented by a dotted line 10c, while the silver particle-containing composition after the substitution, specifically, the silver particle-containing composition coated with butanoic acid, is represented by a solid line 10d.

As shown in FIGS. 5 and 6, the silver particle-containing composition before substitution has high DTA peaks at around 200° C. and 300° C.; however, the silver particle-containing composition after substitution has a high DTA peak around 250° C. In TG analysis, the silver particle-containing composition changes in behavior at around 250° C., more specifically, from 200° C. to 300° C. between before and after the substitution. This can be assumed that the organic compound, or fatty acid, coating the surfaces of the silver particles before substitution is different from that after the substitution, and therefore it can be concluded that the substitution has been done well enough.

In the present invention, the index for determining whether the fatty acid substitution has been achieved is changes in the organic components that coat the surfaces, the changes being observed by subjecting the resultant silver particles to GC-MS. In this description, GC-MC instruments, 7890A GC System and 5975C inert XL EI/CI MSD manufactured by Agilent technologies, Inc. were used for GC-MS analysis. In the analysis, the particles were heated to 350° C., and the components of collected gas were analyzed to obtain the constituents of the organic components.

A quantitative treatment of the substitution was made by integrating every peak in an obtained GC-MS chart to determine the peak area and comparing the peak areas with one another. The chart was analyzed by analysis software, MSD Chem Station (by Aglent technologies, Inc.) designed for measured GC-MS charts. With the analysis software, the peaks derived from all kinds of the organic compounds are subjected to integration processing to determine their peak areas. The substitution ratios in this description were obtained by the following equation.

$$\text{Substitution ratio (\%)} = 100 \times S_2/(S_2+S_1)$$

In this equation, $S_1$ denotes a peak area of a first fatty acid (a) before substitution, while $S_2$ denotes a peak area of a second fatty acid (b) after the substitution.

(Surface Nature Change Evaluation)

Changes in dispersibility of particles in solvents were evaluated by the following technique. First, tetradecane and water were prepared. Note that preliminary tests have demonstrated that metal nanoparticles were prone to disperse in tetradecane, but were not in water. Then, silver particle-containing compositions before and after substitution were respectively added to a vial container containing tetradecane and water and the vial container was shaken to agitate the compositions for about 5 minutes. Changes in the surface nature were evaluated based on which of the tetradecane layer and water layer the silver particle-containing compositions dispersed. As a result, the silver particle-containing composition before substitution dispersed in the tetradecane layer positioned upper than the water layer, but did not disperse in the water layer positioned lower than the tetradecane layer. On the other hand, the silver particle-containing composition after the substitution did not disperse in the upper tetradecane layer, but dispersed in the lower water layer. In this manner, hydrophobic silver particle-containing compositions or hydrophilic silver particle-containing compositions adaptable to the needs can be manufactured by substituting the fatty acid.

The particles obtained through the above-described method is added to a solvent in which the particles can disperse (dispersion step) to obtain a dispersion solution. The particles, dispersion solution and resin are mixed and kneaded (kneading step) to make them into a paste. The paste can be obtained by mixing and kneading the particles, dispersion solution and a dispersing agent. Furthermore, the paste can be obtained by mixing and kneading the particles, dispersion solution, resin, and dispersing agent.

To make sure that the properties of the particles obtained through the method of the invention have changed between before and after substitution, the following evaluation was performed.

(Resistivity Evaluation)

A mixture of 100 parts of silver nanoparticles, 100 parts of silver microparticles, 20 parts of a diluent solvent, 2 parts of a dispersing agent and 0.1 part of an additive were processed into a paste by a three-roll mill (EXAKT M-80S manufactured by Nagase Screen Printing Research Co., Ltd.), thereby obtaining a silver particle-containing composition paste.

The silver particle-containing composition paste was applied on an alumina base plate of 25 mm in width, 25 mm in length, and 0.7 mm in thickness with a metal mask of 30 μm in thickness having an opening of 10 mm in width and 10 mm in length, and was heated at 120° C. in a forced circulation oven. A stylus type surface roughness measuring instrument (SURFCOM 1500DX manufactured by TOKYO SEIMITSU CO., LTD.) was used to measure the thickness of the resultant fired film and a 4-pin probe resistivity meter (Loresta-GP manufactured by Mitsubishi Chemical Corporation) was used to measure the surface resistivity. With the thickness and surface resistivity, the values of volume resistivity of the samples were calculated.

(Evaluation on Low Temperature Sintering Property with Short Chain Fatty Acid Substitution)

The silver particles before and after substitution were raised in temperature from 40° C. to 120° C. at a temperature rise rate of 10° C./min., and maintained at 120° C. for 180 minutes, and TG curves of the silver particles were created by a thermogravimetry/differential thermal analyzer (TG/DTA 6300 manufactured by Seiko Instruments Inc.).

EXAMPLES

Part of the evaluation results of Examples 1 to 18 and Comparative Example 1 using various fatty acids and silver particles are summarized and shown in Table 1.

TABLE 1

|  | fatty acid (a) | carbon number | silver particle diameter | fatty acid (b) | carbon number | fatty acid (b)/ fatty acid (a) | substitution rate (%) |
|---|---|---|---|---|---|---|---|
| Example 1 | sorbic acid | 6 | 100 nm | butanoic acid | 4 | 100 | 97.3 |
| Example 2 | sorbic acid | 6 | 100 nm | octanoic acid | 8 | 100 | 95.8 |
| Example 3 | sorbic acid | 6 | 100 nm | hexanoic acid | 6 | 100 | 78.1 |
| Example 4 | sorbic acid | 6 | 100 nm | malonic acid | 3 | 40 | 100.0 |
| Example 5 | sorbic acid | 6 | 100 nm | butanoic acid | 4 | 10 | 87.0 |
| Example 6 | butanoic acid | 4 | 100 nm | hexanoic acid | 6 | 100 | 95.6 |
| Example 7 | propionic acid | 3 | 100 nm | hexanoic acid | 6 | 100 | 96.5 |
| Example 8 | sorbic acid | 6 | 1 μm | malonic acid | 3 | 40 | 100.0 |
| Example 9 | hexanoic acid | 6 | 20 nm | sorbic acid | 6 | 17 | 91.4 |
| Example 10 | hexanoic acid | 6 | 20 nm | malonic acid | 3 | 6 | 100.0 |
| Example 11 | sorbic acid | 6 | 100 nm | lactic acid | 3 | 100 | 80.2 |
| Example 12 | sorbic acid | 6 | 100 nm | acetic acid | 2 | 100 | 100.0 |
| Example 13 | sorbic acid | 6 | 100 nm | propionic acid | 3 | 100 | 100.0 |
| Example 14 | sorbic acid | 6 | 100 nm | decanoic acid | 10 | 100 | 98.4 |
| Example 15 | sorbic acid | 6 | 100 nm | oleic acid | 18 | 100 | 81.1 |
| Example 16 | sorbic acid | 6 | 100 nm | malic acid | 4 | 100 | 100.0 |
| Example 17 | sorbic acid | 6 | 100 nm | acetylsalicylic acid | 9 | 100 | 56.2 |
| Example 18 | sorbic acid | 6 | 100 nm | octanoic acid | 8 | 0.5 | 48.6 |
| Comparative Example 1 | sorbic acid | 6 | 100 nm | cholic acid | 24 | 100 | 9.4 |

Example 1

After 500 g of isopropyl alcohol was poured into a 1-L (liter) beaker, 100 g of silver particles coated with sorbic acid (a) (coating amount of sorbic acid: 0.5 wt %) and 50 g of butanoic acid (b) were added into the beaker that in turn was agitated by an agitator at 25° C. for 5 hours. The silver particles used herein had an average primary-particle diameter of 100 nm (nanometers) measured by SEM. The slurry obtained by agitation was filtered by a membrane filter. The filtered silver particles were rinsed with 0.5 L of isopropyl alcohol. Subsequent to the rinse, the silver particles were vacuum-dried at 25° C. for 2 hours. In this manner, the silver particles of Example 1 were obtained.

Figure 7:
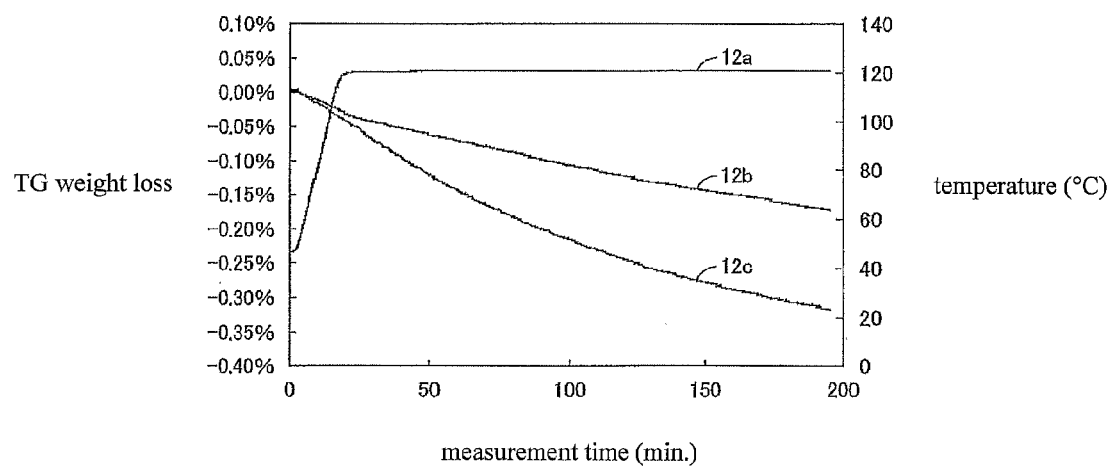
FIG. 7 is a graph showing the relationship of temperature and TG weight loss between before and after substitution when the first fatty acid is sorbic acid and the second fatty acid is butanoic acid.

The relationship of temperature and TG weight loss between before and after substitution is shown in FIG. 7. In FIG. 7, the vertical axis on the left represents TG weight loss (%), the vertical axis on the right represents temperature (° C.), and the horizontal axis represents measurement time (min.). Line 12a indicates temperature, Line 12b indicates a silver particle-containing composition before substitution, specifically, a silver particle-containing composition including silver particles coated with sorbic acid, and Line 12c indicates a silver particle-containing composition after substitution, specifically, a silver particle-containing composition including silver particles coated with butanoic acid. The temperature line 12a expresses that the temperature rose from 40° C. to 120° C. within about 20 minutes and was maintained at 120° C. from then on.

As can be appreciated from this example, the TG weight loss of the silver particle-containing composition before substitution decreases moderately with time. Specifically, the TG weight loss is approximately 0.15% after a lapse of 150 minutes. On the contrary, the TG weight loss of the silver particle-containing composition after substitution exhibits a loss rate greater than the TG weight loss of the silver particle-containing composition before substitution. Specifically, the TG weight loss is approximately 0.30% after a lapse of 150 minutes. The comparison of the TG weight loss shows the possibility that the organic compound coating the surfaces of the silver particles has been changed between before and after the substitution.

Figure 8:
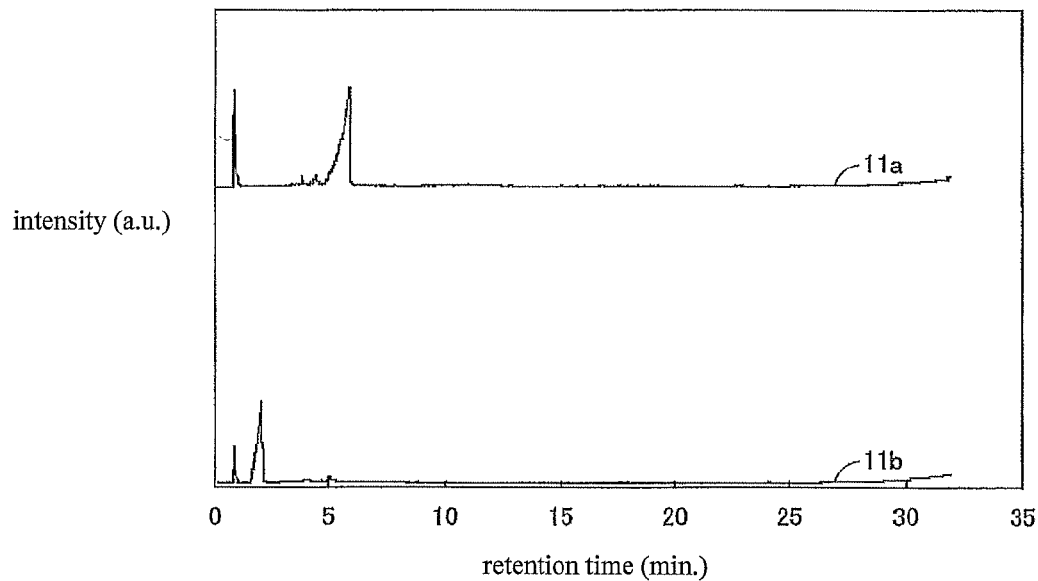
FIG. 8 is a GC-MS chart when the first fatty acid is sorbic acid and the second fatty acid is butanoic acid.

The silver particles before and after substitution were measured by GC-MS. The GC-MS chart is shown in FIG. 8. In FIG. 8, the vertical axis represents peak intensities (a.u.), while the horizontal axis represents retention time (min.). Note that in the GC-MS graphs including this example, the chart before substitution are plotted in an upper part of the graph, and the chart after substitution are plotted in a lower part. In FIG. 8, the chart 11a before substitution is plotted on the upper side, while the chart 11b after substitution is plotted on the lower side of the graph.

The comparison of these charts demonstrates that the organic components composing the surfaces of the silver particles have been changed. Specifically, it is found from the analysis of the charts 11a, 11b that a component on the chart 11a of the silver particle-containing composition before substitution indicates the peak derived from sorbic acid and a component on the chart 11b of the silver particle-containing composition after substitution indicates the peak derived from butanoic acid. In short, the comparison of the charts 11a and 11b demonstrates that the organic compound coating the surfaces of the silver particles has changed from sorbic acid to butanoic acid through the substitution.

Example 2

Figure 9:
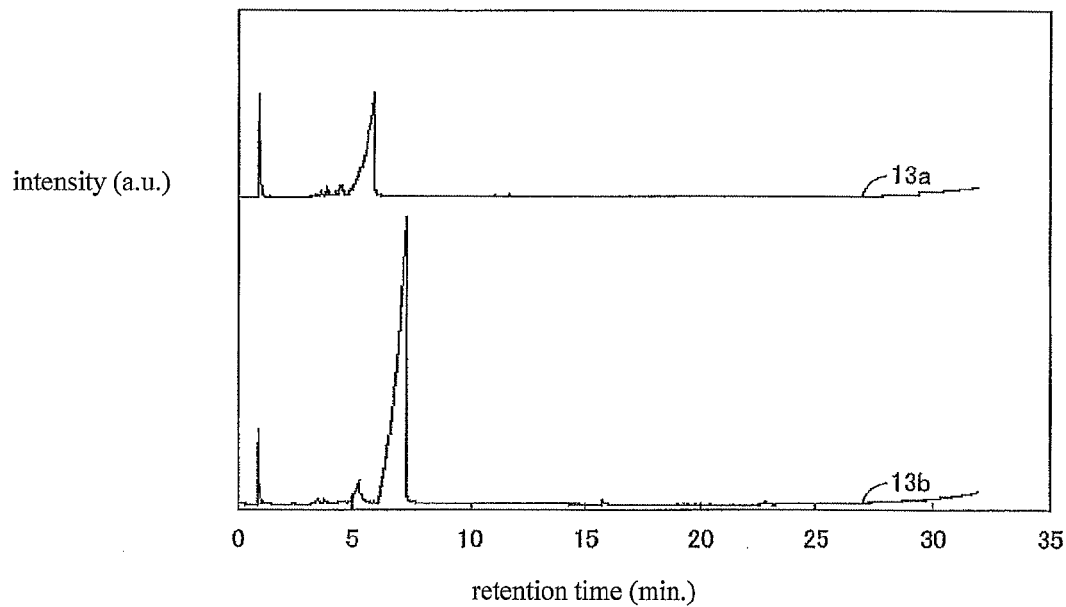
FIG. 9 is a GC-MS chart when the first fatty acid is sorbic acid and the second fatty acid is octanoic acid.

The silver particles of Example 2 were obtained in the same manner as Example 1 except for that the second fatty acid (b) was octanoic acid. FIG. 9 is a chart diagram showing the GC-MS measurement results before and after substitution. The charts 13a, 13b were analyzed and the analysis results indicated that the component at a peak of the silver particles before substitution was derived from sorbic acid and the component at a peak of the silver particles after substitution was derived from octanoic acid. This analysis results demonstrate that the organic component composing the surfaces of the silver particles has been changed from sorbic acid to octanoic acid through the substitution. The relationship of carbon numbers before and after substitution establishes; the carbon number of sorbic acid<the carbon number of octanoic acid. Thus, even substitution of longer chain fatty acids can be made through this method.

Example 3

Figure 10:
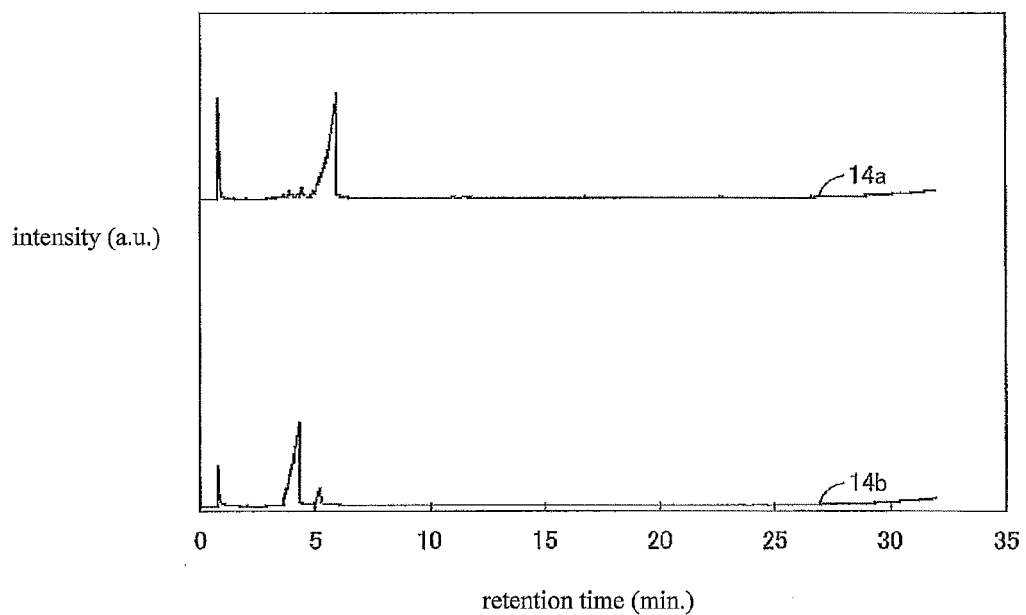
FIG. 10 is a GC-MS chart when the first fatty acid is sorbic acid and the second fatty acid is hexanoic acid.

The silver particles of Example 3 were obtained in the same manner as Example 1 except for that the second fatty acid (b)

was hexanoic acid. FIG. 10 is a chart diagram showing the GC-MS measurement results before and after substitution. The charts 14a, 14b were analyzed and the analysis results indicated that the component at a peak of the silver particles before substitution was derived from sorbic acid and the component at a peak of the silver particles after substitution was derived from hexanoic acid. This analysis results demonstrate that the organic component composing the surfaces of the silver particles has been changed from sorbic acid to hexanoic acid through the substitution. The relationship of carbon atom numbers before and after substitution establishes; carbon atom number of sorbic acid=carbon atom numbers of hexanoic acid. Thus, even substitution of fatty acids with the same number of carbon atoms can be made through this method.

Example 4

Figure 11:
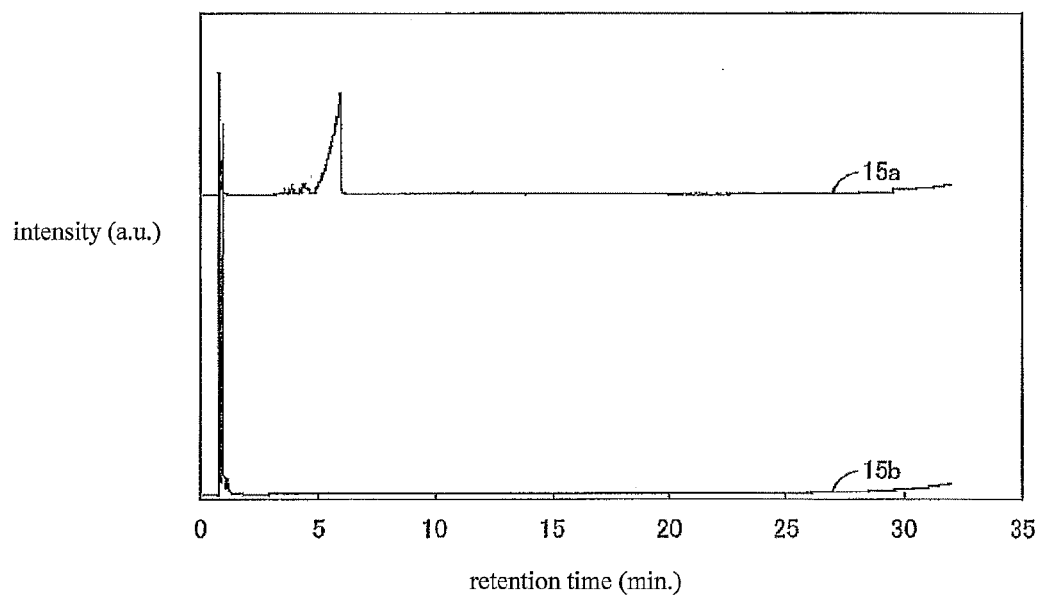
FIG. 11 is a GC-MS chart when the first fatty acid is sorbic acid and the second fatty acid is malonic acid.

The silver particles of Example 4 were obtained in the same manner as Example 1 except for that the second fatty acid (b) was malonic acid and the added amount of malonic acid was 20 g. FIG. 11 is a chart diagram showing the GC-MS measurement results before and after substitution. Note that the GC-MS measurement was made by analyzing vapor generated from samples heated to 350° C. by an MS instrument. In the measurement, the malonic acid was decomposed into acetic acid at 140° C. The charts 15a, 15b were analyzed and the analysis results indicated that the component at a peak of the silver particles before substitution was derived from sorbic acid and the component at a peak of the silver particles after substitution was derived from acetic acid that was considered a decomposition product of the malonic acid. This analysis results demonstrate that the organic component composing the surfaces of the silver particles has been changed from sorbic acid to malonic acid through the substitution.

Example 5

Figure 12:
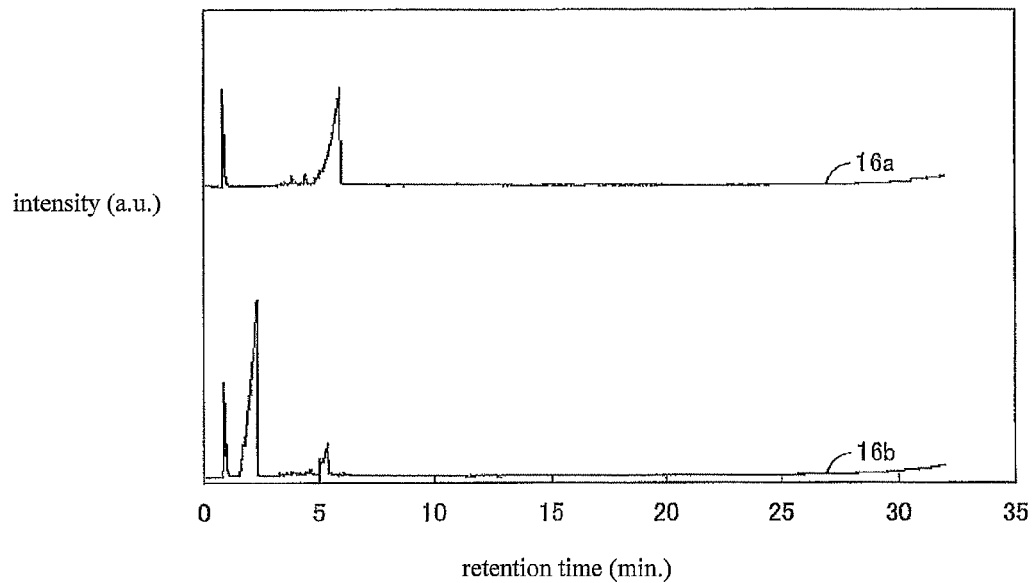
FIG. 12 is a GC-MS chart when the first fatty acid is sorbic acid, the second fatty acid is butanoic acid, and the added amount of butanoic acid is 5 g.

The silver particles of Example 5 were obtained in the same manner as Example 1 except for that 50 g of butanoic acid as a second fatty acid (b) was added instead of 5 g. FIG. 12 is a chart diagram showing the GC-MS measurement results before and after substitution. The charts 16a, 16b were analyzed and the analysis results indicated that the component at a peak of the silver particles before substitution was derived from sorbic acid and the component at a peak of the silver particles after substitution was derived from butanoic acid. This analysis results demonstrate that the organic component composing the surfaces of the silver particles has been changed from sorbic acid to butanoic acid through the substitution. The difference in peak intensity of butanoic acid between FIG. 8 and FIG. 12 is probably caused by the difference in coating condition due to the change in the added amount of butanoic acid.

Example 6

The silver particles of Example 6 were obtained in the same manner as Example 3 except for that the first fatty acid (a) was butanoic acid (coating amount of butanoic acid: 0.5 wt %). The charts obtained by GC-MS measurement before and after substitution were analyzed and the analysis results indicated that the component at a peak of the silver particles before substitution was derived from butanoic acid and the component at a peak of the silver particles after substitution was derived from hexanoic acid. This analysis results demonstrate that the organic component composing the surfaces of the silver particles has been changed from butanoic acid to hexanoic acid through the substitution.

Example 7

The silver particles of Example 7 were obtained in the same manner as Example 6 except for that the first fatty acid (a) was propionic acid (coating amount of propionic acid: 0.5 wt %). The charts obtained by GC-MS measurement before and after substitution were analyzed and the analysis results indicated that the component at a peak of the silver particles before substitution was derived from propionic acid and the component at a peak of the silver particles after substitution was derived from hexanoic acid. This analysis results demonstrate that the organic component composing the surfaces of the silver particles has been changed from propionic acid to hexanoic acid through the substitution.

Example 8

Figure 13:
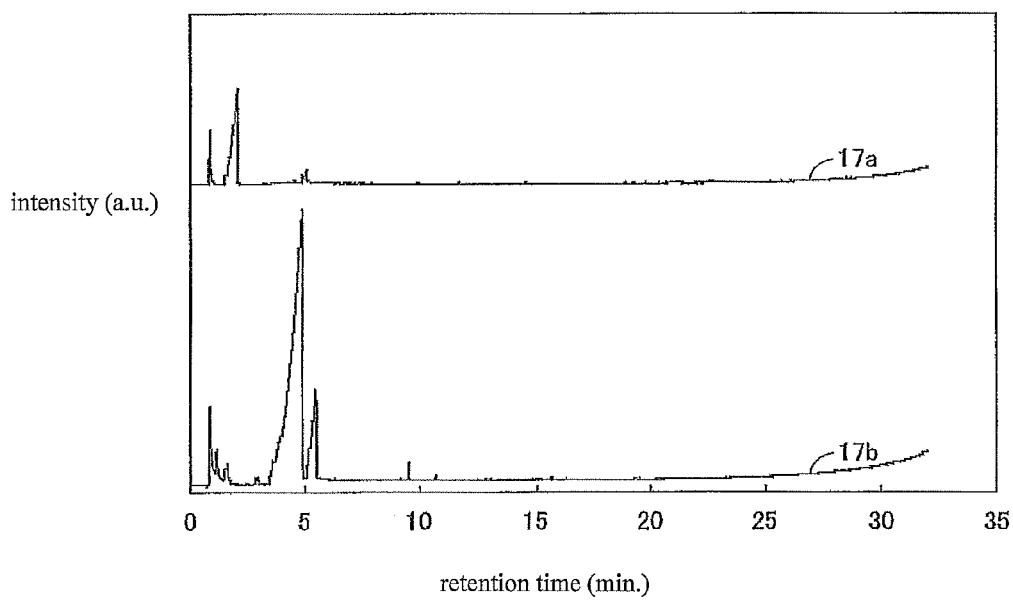
FIG. 13 is a GC-MS chart when the first fatty acid is sorbic acid, the second fatty acid is malonic acid, and the average diameter of the silver particles is 1 μm.

The silver particles of Example 8 were obtained in the same manner as Example 4 except for that the silver particles was coated with sorbic acid as a first fatty acid (a) (coating amount of sorbic acid: 0.1 wt %) and had an average diameter of 1 µm measured by a Microtrac and the added amount of malonic acid was 4 g. FIG. 13 is a chart diagram showing the GC-MS measurement results before and after substitution. The charts 17a, 17b were analyzed and the analysis results indicated that the component at a peak of the silver particles before substitution was derived from sorbic acid and the component at a peak of the silver particles after substitution was derived from acetic acid that was considered a decomposition product of the malonic acid. This analysis results demonstrate that the organic component composing the surfaces of the silver particles has been changed from sorbic acid to malonic acid through the substitution.

Example 9

The silver particles of Example 9 were obtained in the same manner as Example 3 except for that the silver particles was coated with hexanoic acid as a first fatty acid (a) (coating amount of hexanoic acid: 3.0 wt %) and had an average diameter of 20 nm measured by TEM and the second fatty acid (b) was sorbic acid. The charts obtained by GC-MS measurement before and after substitution were analyzed and the analysis results indicated that the component at a peak of the silver particles before substitution was derived from hexanoic acid and the component at a peak of the silver particles after substitution was derived from sorbic acid. This analysis results demonstrate that the organic component composing the surfaces of the silver particles has been changed from hexanoic acid to sorbic acid through the substitution.

Example 10

The silver particles of Example 10 were obtained in the same manner as Example 9 except for that the second fatty acid (b) was malonic acid and the added amount of the malonic acid was 20 g. The charts obtained by GC-MS measurement before and after substitution were analyzed and the analysis results indicated that the component at a peak of the silver particles before substitution was derived from hexanoic acid and the component at a peak of the silver particles after substitution was derived from acetic acid that was considered a decomposition product of the malonic acid. This analysis results demonstrate that the organic component composing the surfaces of the silver particles have been changed from sorbic acid to malonic acid through the substitution.

Example 11

Figure 14:
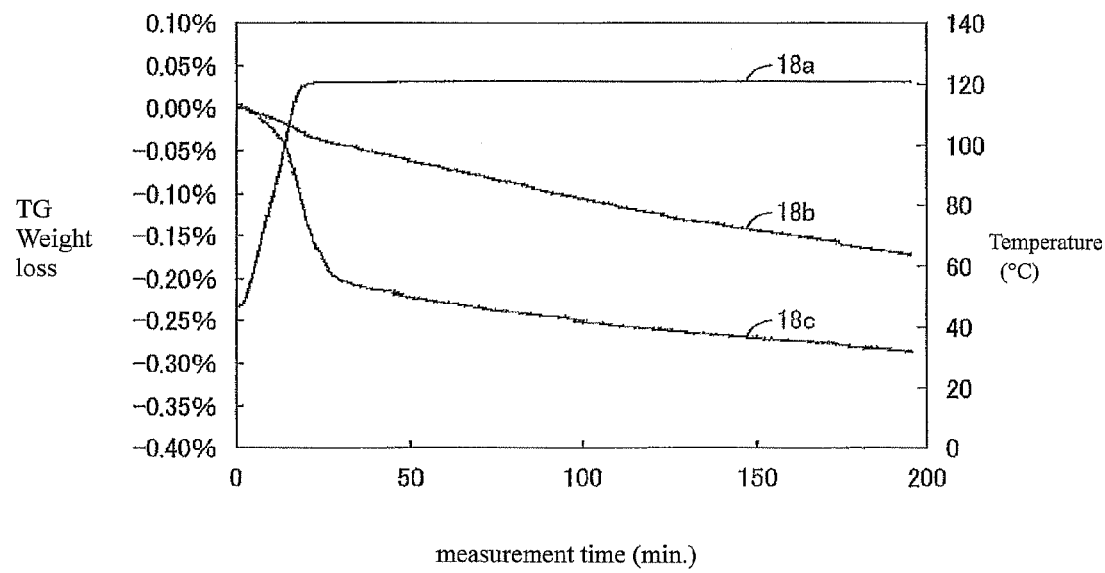
FIG. 14 is a graph showing the relationship of temperature and TG weight loss between before and after substitution when the first fatty acid is sorbic acid and the second fatty acid is lactic acid.

The silver particles of Example 11 were obtained in the same manner as Example 1 except for that the second fatty acid (b) was lactic acid. FIG. 14 shows the relationship of temperature and TG weight loss between before and after substitution. In FIG. 14 corresponding to FIG. 7, Line 18a indicates temperature, Line 18b indicates a silver particle-containing composition before substitution, specifically, a silver particle-containing composition including silver particles coated with sorbic acid, and Line 18c indicates a silver particle-containing composition after substitution, specifically, a silver particle-containing composition including silver particles coated with lactic acid.

Referring to FIG. 14, the TG weight loss of the silver particle-containing composition before substitution decreases moderately with time. Specifically, the TG weight loss is approximately 0.05% after a lapse of 30 minutes immediately after the temperature has reached 120° C. On the contrary, the TG weight loss of the silver particle-containing composition after substitution exhibits a loss rate greater than the TG weight loss of the silver particle-containing composition before substitution. Specifically, the TG weight loss is approximately 0.21% after a lapse of 30 minutes. The comparison of the TG weight loss shows that the organic compound coating the surfaces of the silver particles has been changed between before and after the substitution.

The charts obtained by GC-MS measurement before and after substitution were analyzed and the analysis results indicated that the component at a peak of the silver particles before substitution was derived from sorbic acid and the component at a peak of the silver particles after substitution was derived from lactic acid. This analysis results demonstrate that the organic component composing the surfaces of the silver particles have been changed from sorbic acid to lactic acid through the substitution.

Figure 15:
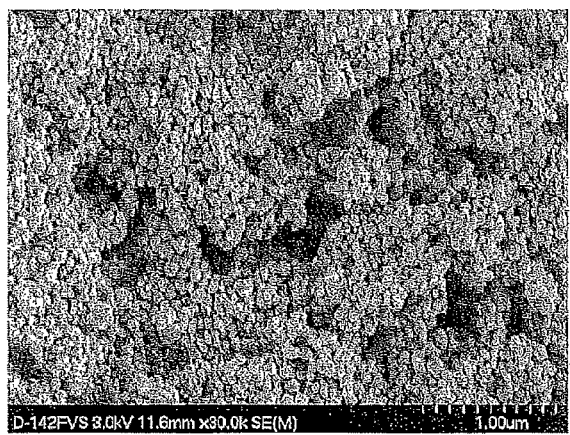
FIG. 15 is an SEM image of a silver particle-containing composition including silver particles with lactic acid thereon as a result of substitution, the image being taken before a firing process at 120° C. under an atmosphere.
Figure 16:
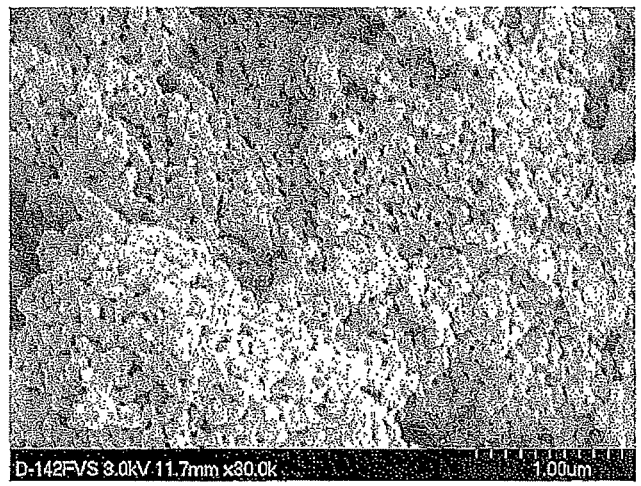
FIG. 16 is an SEM image of the silver particle-containing composition including silver particles with lactic acid thereon as a result of substitution, the image being taken after the firing process at 120° C. under an atmosphere.
Figure 17:
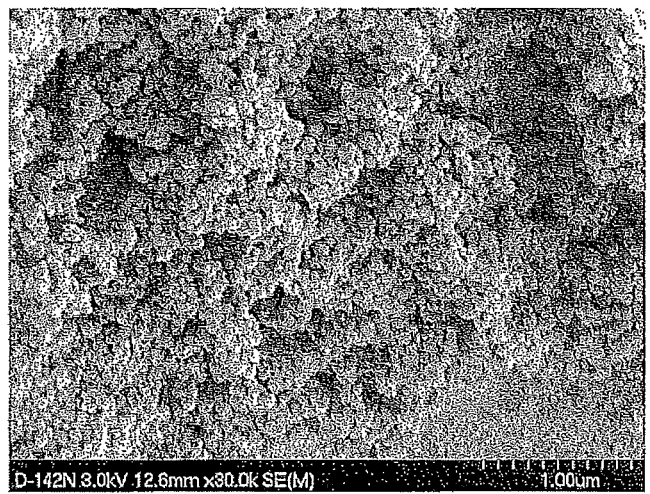
FIG. 17 is an SEM image of a silver particle-containing composition including silver particles with sorbic acid thereon as a result of substitution, the image being taken before a firing process at 120° C. under an atmosphere.
Figure 18:
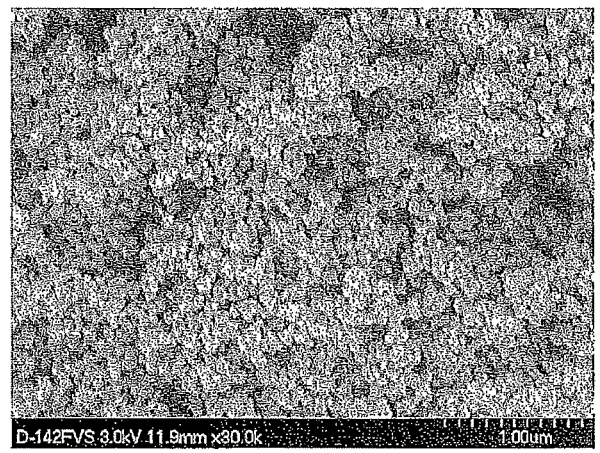
FIG. 18 is an SEM image of the silver particle-containing composition including silver particles with sorbic acid thereon as a result of substitution, the image being taken after the firing process at 120° C. under an atmosphere.

FIGS. 15 and 16 show SEM images of a silver particle-containing composition before and after it was fired at 120° C. under an atmosphere, the composition including silver particles with lactic acid thereon as a result of substitution. FIG. 15 shows the composition before firing, while FIG. 16 shows the fired composition. For reference, SEM images of a silver particle-containing composition including silver particles coated with sorbic acid before and after firing at 120° C. under an atmosphere are shown in FIGS. 17 and 18, respectively. FIG. 17 shows the composition before firing, while FIG. 18 shows the fired composition. By referring to FIGS. 15 to 18, the silver particles coated with sorbic acid before and after firing are much the same in appearance; however, fusion caused by firing is observed in the silver particles coated with lactic acid. This can be understood that the sintering property at low temperatures has been improved.

Regarding volume resistivity of samples fired at 120° C. for 1 hour, the silver particles coated with sorbic acid has a volume resistivity of 767.9 μΩ·cm, while the silver particles coated with lactic acid has a volume resistivity of 200.7 μΩ·cm. The volume resistivity results demonstrate that the substitution of shorter chain fatty acids has enhanced sintering at low temperatures.

Example 12

The silver particles of Example 12 were obtained in the same manner as Example 1 except for that the second fatty acid (b) was acetic acid. The charts obtained by GC-MS measurement before and after substitution were analyzed and the analysis results indicated that the component at a peak of the silver particles before substitution was derived from sorbic acid and the component at a peak of the silver particles after substitution was derived from acetic acid. This analysis results demonstrate that the organic component composing the surfaces of the silver particles has been changed from sorbic acid to acetic acid through the substitution.

Example 13

The silver particles of Example 13 were obtained in the same manner as Example 1 except for that the second fatty acid (b) was propionic acid. The charts obtained by GC-MS measurement before and after substitution were analyzed and the analysis results indicated that the component at a peak of the silver particles before substitution was derived from sorbic acid and the component at a peak of the silver particles after substitution was derived from propionic acid. This analysis results demonstrate that the organic component composing the surfaces of the silver particles has been changed from sorbic acid to propionic acid through the substitution.

Example 14

The silver particles of Example 14 were obtained in the same manner as Example 1 except for that the second fatty acid (b) was decanoic acid. The charts obtained by GC-MS measurement before and after substitution were analyzed and the analysis results indicated that the component at a peak of the silver particles before substitution was derived from sorbic acid and the component at a peak of the silver particles after substitution was derived from decanoic acid. This analysis results demonstrate that the organic component composing the surfaces of the silver particles has been changed from sorbic acid to decanoic acid through the substitution.

Example 15

The silver particles of Example 15 were obtained in the same manner as Example 1 except for that the second fatty acid (b) was oleic acid. The charts obtained by GC-MS measurement before and after substitution were analyzed and the analysis results indicated that the component at a peak of the silver particles before substitution was derived from sorbic acid and the component at a peak of the silver particles after substitution was derived from oleic acid. This analysis results demonstrate that the organic component composing the surfaces of the silver particles has been changed from sorbic acid to oleic acid through the substitution.

Example 16

The silver particles of Example 16 were obtained in the same manner as Example 1 except for that the second fatty acid (b) was malic acid. The charts obtained by GC-MS measurement before and after substitution were analyzed and the analysis results indicated the component at a peak of the silver particles before substitution was derived from sorbic acid and the component at a peak of the silver particles after substitution was derived from malic acid. This analysis results demonstrate that the organic component composing the surfaces of the silver particles has been changed from sorbic acid to malic acid through the substitution.

Example 17

The silver particles of Example 17 were obtained in the same manner as Example 1 except for that the second fatty acid (b) was acetylsalicylic acid. The charts obtained by GC-MS measurement before and after substitution were analyzed and the analysis results indicated that the component at a peak of the silver particles before substitution was derived from sorbic acid and the component at a peak of the silver particles after substitution was derived from acetylsalicylic acid. This analysis results demonstrate that the organic component composing the surfaces of the silver particles has been changed from sorbic acid to acetylsalicylic acid through the substitution.

The silver particles coated with acetylsalicylic acid were subjected to surface nature evaluation. Most particles were settled on the water layer side, while only some particles were retained in the tetradecane layer. On the other hand, the same surface nature evaluation performed on the silver particles coated with sorbic acid resulted in that most particles were retained in the tetradecane layer. This demonstrates that substitution of organic compounds can convert the hydrophilic particles into hydrophobic particles, for example.

Example 18

Figure 19:
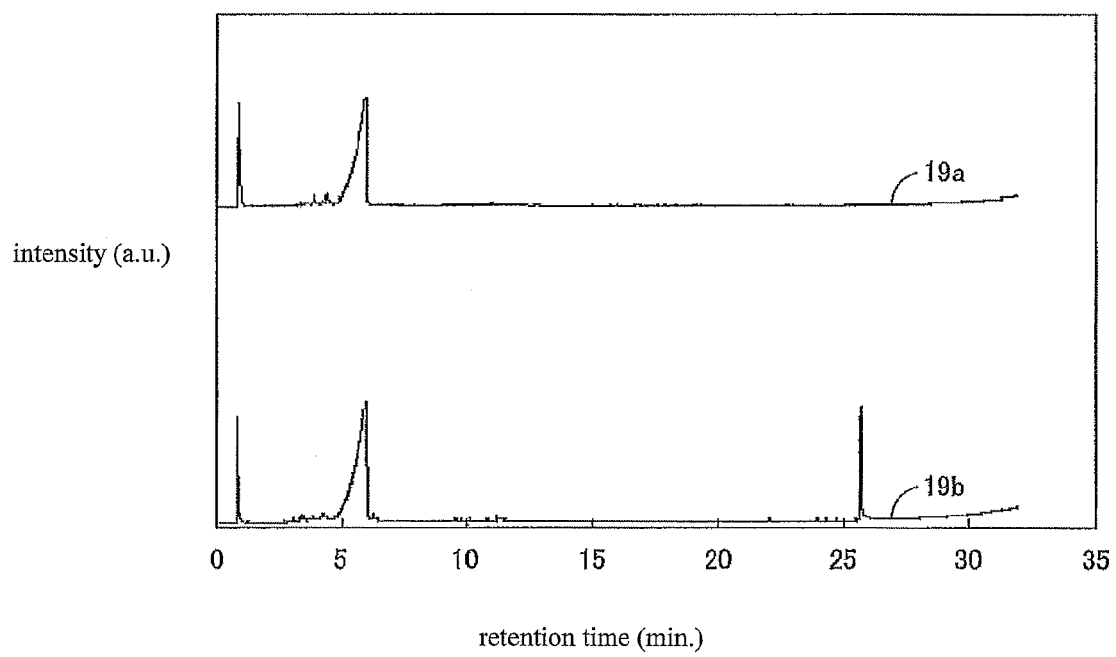
FIG. 19 is a GC-MS chart when the first fatty acid is sorbic acid, the second fatty acid is octanoic acid, and the added amount of octanoic acid is 0.25 g.

The silver particles of Example 18 were obtained in the same manner as Example 1 except for that the second fatty acid (b) was octanoic acid and the added amount of the octanoic acid was 0.25 g. FIG. 19 is a chart diagram showing the GC-MS measurement results before and after substitution. The charts 19a, 19b were analyzed and the analysis results indicated that the component at a peak of the silver particles before substitution was derived from sorbic acid and the component at a peak of the silver particles after substitution was derived from sorbic acid and octanoic acid. This analysis results demonstrate that the organic component composing the surfaces of the silver particles has not been completely changed from sorbic acid to octanoic acid through the substitution and the sorbic acid partially has remained. Consequently, it is apparently important to appropriately adjust the ratio of the amount of fatty acid to be added in order to achieve a desired substitution ratio.

Comparative Example 1

Figure 20:
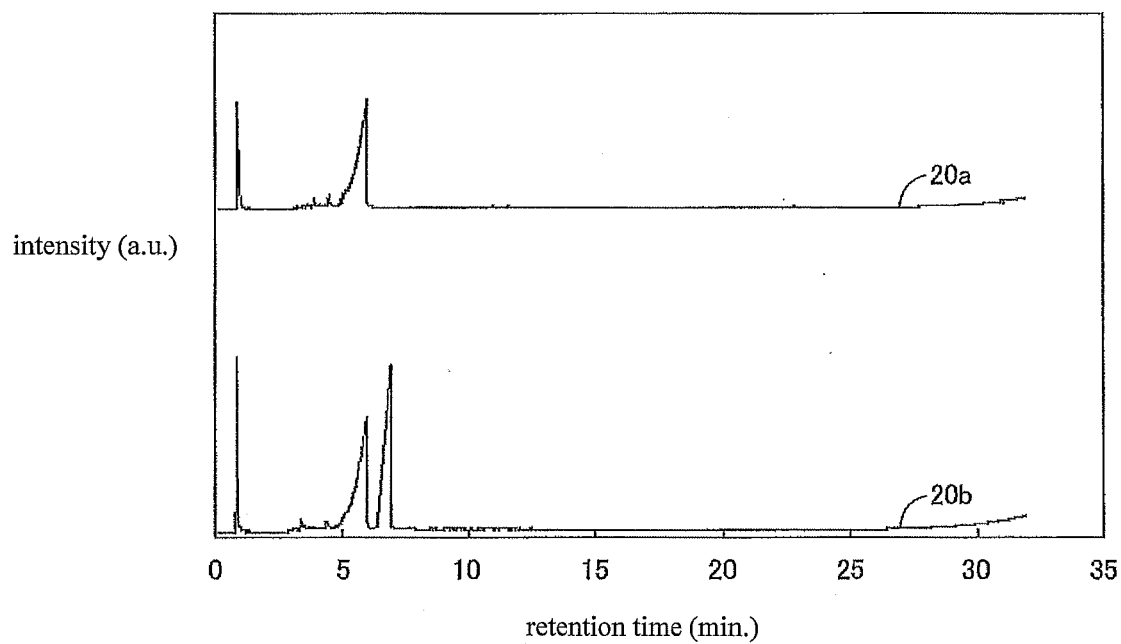
FIG. 20 is a GC-MS chart when the first fatty acid is sorbic acid and the second fatty acid is cholic acid.

The silver particles of Comparative Example 1 were obtained in the same manner as Example 1 except for that the second fatty acid (b) was cholic acid. FIG. 20 is a chart diagram showing the GC-MS measurement results before and after substitution. The charts 20a, 20b were analyzed and the analysis results indicated that the component at a peak of the silver particles before substitution was derived from sorbic acid and the component at a peak of the silver particles after substitution was derived from sorbic acid and cholic acid. This analysis results demonstrate that the organic component composing the surfaces of the silver particles has not been completely changed from sorbic acid to cholic acid through the substitution. From Comparative Example 1, Example 15 using a fatty acid with 18 carbon atoms and some other factors, it can be concluded that the number of carbon atoms of the second fatty acid to achieve acceptable substitution is up to approximately 20.

In the above embodiment, the first and second fatty acids are carboxylic acid; however, the present invention is not limited thereto and there may be no problem that at least the first fatty acid is carboxylic acid.

In addition, the solvent removal step in the above embodiment involves filtration; however, the present invention is not limited to the filtration described above. For example, the solvent and the silver particle-containing composition can be separated by centrifugation to remove the solvent.

In the above embodiment, the solvent removal step for removing solvent is performed after the substitution step; however, the present invention is not limited thereto. If the next process can be performed with the solvent, the solvent removal step can be omitted. In addition, if there is no need to clean the particles after substitution, the cleaning step can be also omitted. Furthermore, if the process after the substitution step is performed with the wet silver particle-containing composition, the drying step can be also omitted.

The foregoing has described the embodiment of the present invention by referring to the drawings. However, the invention should not be limited to the illustrated embodiment. It should be appreciated that various modifications and changes can be made to the illustrated embodiment within the scope of the appended claims and their equivalents.

INDUSTRIAL APPLICABILITY

The silver particle-containing composition, the dispersion solution and the paste and the method for manufacturing them according to the present invention are effectively used to manufacture silver particles that are especially used for so-called "printed electronics" including printed CPUs, printed lighting devices, printed RFID tags, all-printed displays, sensors, printed wiring boards, organic solar cells, electronic books, nano-imprinted LEDs, liquid crystal-PDP panels, and printed memory.

REFERENCE SIGNS LIST

1: silver particle-containing composition
2: silver particle
3: surface of silver particle
4: fatty acid

The invention claimed is:
1. A method for manufacturing a silver particle-containing composition coated with a fatty acid, comprising the steps of:
preparing silver particles coated with a first fatty acid (a) as sorbic acid, a second fatty acid (b) as butanoic acid, octanoic acid, hexanoic acid, malonic acid, sorbic acid, lactic acid, acetic acid, propionic acid, decanoic acid, oleic acid, malic acid, acetylsalicylic acid, or cholic acid, and isopropyl alcohol as a solvent in which the first and second fatty acids can disperse, respectively;
adding the silver particles coated with the first fatty acid (a) and the second fatty acid (b) into the solvent; and
substituting the second fatty acid (b) for the first fatty acid (a) coating the silver particles after the addition step.
2. The method for manufacturing the silver particle-containing composition according to claim 1, wherein the substituting step includes the steps of:
agitating the silver particles coated with the first fatty acid (a) and the second fatty acid added in the solvent; and
subjecting the solvent to an ultrasonic vibration process with ultrasound after the agitating step.
3. The method for manufacturing the silver particle-containing composition according to claim 1, wherein the second fatty acid (b) is lactic acid.
4. A method for manufacturing a silver particle-containing composition coated with a fatty acid, comprising the steps of:
preparing silver particles coated with a first fatty acid (a), a second fatty acid (b), and isopropyl alcohol as a solvent in which the first and second fatty acids can disperse, respectively;

adding the silver particles coated with the first fatty acid (a) and the second fatty acid (b) into the solvent; and
substituting the second fatty acid (b) for the first fatty acid (a) coating the silver particles after the addition step,
wherein the number of carbon atoms of the first fatty acid (a) is 6 and the number of carbon atoms of the second fatty acid (b) is 3.

* * * * *